United States Patent
Suzuki et al.

(10) Patent No.: US 10,775,555 B2
(45) Date of Patent: Sep. 15, 2020

(54) OPTICAL FIBER LINE AND OPTICAL FIBER LINE MANUFACTURING METHOD

(71) Applicant: SUMITOMO ELECTRIC INDUSTRIES, LTD., Osaka-shi, Osaka (JP)

(72) Inventors: Masato Suzuki, Yokohama (JP); Yoshiaki Tamura, Yokohama (JP); Yoshinori Yamamoto, Yokohama (JP); Takemi Hasegawa, Yokohama (JP); Suguru Takasaki, Yokohama (JP); Saori Kubara, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/417,794

(22) Filed: May 21, 2019

(65) Prior Publication Data

US 2019/0278021 A1   Sep. 12, 2019

Related U.S. Application Data

(63) Continuation of application No. PCT/JP2017/042249, filed on Nov. 24, 2017.

(30) Foreign Application Priority Data

Nov. 25, 2016   (JP) .................. 2016-229085

(51) Int. Cl.
 *G02B 6/02*   (2006.01)
 *G02B 6/036*   (2006.01)
 *G02B 6/255*   (2006.01)

(52) U.S. Cl.
 CPC ...... *G02B 6/02019* (2013.01); *G02B 6/03611* (2013.01); *G02B 6/2551* (2013.01); *G02B 6/03627* (2013.01)

(58) Field of Classification Search
 None
 See application file for complete search history.

(56) References Cited

U.S. PATENT DOCUMENTS

2002/0181885 A1   12/2002   Suzuki et al.
2003/0063875 A1*   4/2003   Bickham ............ G02B 6/0285
                                                                 385/98

FOREIGN PATENT DOCUMENTS

JP   H09-15441 A   1/1997
JP   2000-98171 A   4/2000
(Continued)

OTHER PUBLICATIONS

Cai, Jin-Xing et al., "49.3 Tb/s Trasmission Over 9100 km Using C+L EDFA and 54 Tb/s Transmission Over 9150 km Using Hybrid-Raman EDFA," Journal of Lightwave Technology, vol. 33, No. 13, Jul. 2015, pp. 2724-2734.
(Continued)

Primary Examiner — Jerry Rahll
(74) Attorney, Agent, or Firm — Faegre Drinker Biddle & Reath LLP

(57) ABSTRACT

The present embodiment relates to an optical fiber line or the like configured by connecting a single-mode optical fiber with a cladding containing fluorine and a large $A_{eff}$ optical fiber by TEC connection, and a connection state between such two types of optical fibers is set such that a connection loss expressed in dB of a fundamental mode is equal to or less than 55% of an ideal butt loss expressed in dB at a wavelength of 1550 nm.

18 Claims, 19 Drawing Sheets

(56) References Cited

FOREIGN PATENT DOCUMENTS

| JP | 2002-365469 A | 12/2002 |
|---|---|---|
| JP | 2003-14973 A | 1/2003 |
| JP | 2004-191998 A | 7/2004 |
| JP | 2007-535002 A | 11/2007 |
| WO | WO-2005/109058 A1 | 11/2005 |

OTHER PUBLICATIONS

Hirano, Masaaki et al., "Aeff-enlarged Pure-Silica-Core Fiber having Ring-Core Profile," OFC/NFOEC Technical Digest, OTh4l.2, 2012, 3 pages.

Krause, John T. et al., "Splice Loss of Single-Mode Fiber As Related to Fusion Time, Temperature, and Index Profile Alteration," Journal of Lightwave Technology, vol. LT-4, No. 7, Jul. 1986, pp. 837-840.

Makovejs, Sergejs et al., "Towards Superior Transmission Performance in Submarine Systems: Leveraging UltraLow Attenuation and Large Effective Area," Journal of Lightwave Technology, vol. 34, No. 1, Jan. 2016, pp. 114-120.

Shiraishi, Kazuo et al., "Beam Expanding Fiber Using Thermal Diffusion of the Dopant," Journal of Lightwave Technology, vol. 8, No. 8, Aug. 1990, pp. 1151-1161.

Yamamoto, Yoshinori et al., "Low-Loss and Low-Nonlinearity Pure-Silica-Core Fiber for C- and L-band Broadband Transmission," Journal of Lightwave Technology, vol. 34, No. 2, Jan. 2016, pp. 321-326.

\* cited by examiner

Fig.6

| | Aeff [μm²] (1550nm) | MFD [μm] (1550nm) | GeO₂-DOPING CONCENTRATION IN CORE [mol%] | F-DOPING CONCENTRATION IN INNER REGION OF CLADDING [ppm] | CORE SHAPE |
|---|---|---|---|---|---|
| FIBER 1 | 82.7 | 10.3 | 0 | 12000 | STEP TYPE |
| COMPARATIVE FIBER | 82.8 | 10.5 | 0.03 | 0 | STEP TYPE |

*Fig.7*

|  | Aeff[$\mu m^2$] (1550nm) | MFD[$\mu m$] (1550nm) | CORE SHAPE |
|---|---|---|---|
| FIBER 2 | 138.9 | 12.5 | RING TYPE |
| FIBER 3 | 147.8 | 12.9 | RING TYPE |
| FIBER 4 | 161.6 | 13.3 | RING TYPE |

*Fig.8*

|  | FIRST OPTICAL FIBER | SECOND OPTICAL FIBER |
|---|---|---|
| SAMPLE 1 | FIBER 1 | FIBER 2 |
| SAMPLE 2 | FIBER 1 | FIBER 3 |
| SAMPLE 3 | FIBER 1 | FIBER 4 |
| COMPARATIVE EXAMPLE 1 | COMPARATIVE FIBER | FIBER 2 |
| COMPARATIVE EXAMPLE 2 | COMPARATIVE FIBER | FIBER 3 |
| COMPARATIVE EXAMPLE 3 | COMPARATIVE FIBER | FIBER 4 |

Fig.18

| | SAMPLE 1 | SAMPLE 2 | SAMPLE 3 | COMPAR-ATIVE EXAMPLE 1 | COMPAR-ATIVE EXAMPLE 2 | COMPAR-ATIVE EXAMPLE 3 |
|---|---|---|---|---|---|---|
| CONNECTION LOSS (WITHOUT ADDITIONAL HEATING STEP) [dB] | 0.21±0.03 | 0.24±0.02 | 0.34±0.03 | 0.19±0.01 | 0.23±0.02 | 0.33±0.03 |
| CONNECTION LOSS (WITH ADDITIONAL HEATING STEP) [dB] | 0.06±0.02 | 0.08±0.02 | 0.09±0.03 | 0.16±0.01 | 0.18±0.01 | 0.22±0.03 |
| PERCENTAGE OF CONNECTION LOSS AFTER ADDITIONAL HEATING STEP [%] | 29 | 33 | 26 | 84 | 78 | 67 |

OPTICAL FIBER LINE AND OPTICAL FIBER LINE MANUFACTURING METHOD

CROSS-REFERENCE TO RELATED APPLICATIONS

This application is a continuation application of PCT/JP2017/042249 claiming the benefit of priority of the Japanese Patent Application No. 2016-229085 filed on Nov. 25, 2016, the entire contents of which are incorporated herein by reference.

TECHNICAL FIELD

The present invention relates to an optical fiber line and an optical fiber line manufacturing method.

BACKGROUND ART

As described in Non-Patent Documents 1 to 3, in ultra long-haul large-capacity transmission, notably an optical submarine cable system, for example, in order to maximize an optical signal-to-noise ratio in the system, optical fibers with a low transmission loss and large effective area ($A_{eff}$) (Low-loss large-$A_{eff}$ optical fibers) have been used. At present, large $A_{eff}$ optical fibers having an $A_{eff}$ of 130 to 150 $\mu m^2$ at a wavelength of 1.55 $\mu m$ have been adopted to the optical submarine cable system. However, in repeaters of the system, single-mode optical fibers conforming to ITU-T G.652 or G.654C have been commonly used as feedthroughs.

A typical connection loss caused by fusion-splicing between the large $A_{eff}$ optical fiber and the single-mode optical fiber is 0.3 dB per connection at a wavelength 1550 nm. As described in Non-Patent Document 4, a typical span loss in a transmission system having a capacity distance product exceeding 500 Pb/s×km is 10 dB. The above-described connection loss is too high to be neglected as compared with this span loss. For this reason, it is desirable to reduce the connection loss between the large $A_{eff}$ optical fiber and the single-mode optical fiber.

One of the causes of the connection loss between the large $A_{eff}$ optical fiber and the single-mode optical fiber is that a difference in mode field diameter (MFD) between the large $A_{eff}$ optical fiber and the single-mode optical fiber prevents all optical power from being coupled to a fundamental mode in a transition section extending across the two optical fibers (a section where the MFD changes along the longitudinal direction). In Non-Patent Document 1, described is that a large $A_{eff}$ optical fiber having a double core (ring type core) structure in which a second core located outside a first core has a higher refractive index can make the MFD small relative to the same $A_{eff}$ as compared with a large $A_{eff}$ optical fiber having a core (step type core) structure that has a conventional step type refractive index distribution. Therefore, the use of an optical fiber having a ring type core as the large $A_{eff}$ optical fiber rather than an optical fiber having a step type core makes it possible to reduce an MFD mismatch (makes it possible to reduce the connection loss). However, a theoretically calculated connection loss between a single-mode optical fiber with an $A_{eff}$ of 83 $\mu m^2$ at a wavelength of 1.55 $\mu m$ and a large $A_{eff}$ optical fiber having a ring type core with an $A_{eff}$ of 148 $\mu m^2$ at the wavelength of 1.55 $\mu m$ remains high at 0.22 dB.

Examples of a method for further reducing the connection loss between ends of two optical fibers that are different from each other in MFD include a bridge connection for interposing and connecting an optical fiber having an intermediate $A_{eff}$, a taper connection for physically tapering a connection point, and a core diffusion connection (thermally expanded core (TEC) connection) for heating a connection point to enlarge a core.

In Patent Document 1, disclosed is a method of bridge connection using an ultra-short bridge fiber. The bridge connection causes the number of connection points to increase, which may make a system complicated. Further, in Non-Patent Document 3, described is a loss reduction method using taper connection. Note that the taper connection causes the connection point to be tapered, which may lead to a reduction in the mechanical strength.

The TEC connection does not have a risk arising from the bridge connection or the taper connection and is the most practical connection method for an optical submarine cable system and the like. The TEC connection is described in Non-Patent Document 5. Forming a tapered MFD (a state in which the MFD continuously increases or decreases along the longitudinal direction) around the connection point reduces or eliminates the MFD mismatch at the connection point. The tapered IVIED is generally realized by diffusing, by heat, a dopant doped to a core of an optical fiber to enlarge the MFD.

CITATION LIST

Patent Literature

Patent Document 1: Japanese Unexamined Patent Publication No. 2004-191998
Patent Document 2: Japanese Unexamined Patent Publication No. 2007-535002
Patent Document 3: Japanese Unexamined Patent Publication No. H9-15441
Patent Document 4: Japanese Unexamined Patent Publication No. 2003-14973
Patent Document 5: Japanese Unexamined Patent Publication No. 2000-98171
Patent Document 6: WO 01/033266

Non Patent Literature

Non-Patent Document 1: Y. Yamamoto, et al, "Low-loss and Low-Nonlinearity Pure-Silica-Core Fiber for C- and L-band Broadband Transmission", Journal of Lightwave Technology, Vol. 34, No. 2, pp. 321-326 (January 2016).
Non-Patent Document 2: M. Hirano, et al, "$A_{eff}$ enlarged Pure-Silica-Core Fiber having Ring-Core Profile", OFC/NFOEC Technical Digest, OTh4I.2 (2012).
Non-Patent Document 3: S. Makovejs, et al, "Towards Superior Transmission Performance in Submarine Systems: Leveraging Ultra Low Attenuation and Large Effective Area", Journal of Lightwave Technology, Vol. 34, No. 1, pp. 114-120 (January 2016).
Non-Patent Document 4: J.-X. Cai, et al, "49.3 Tb/s Transmission Over 9100 km Using C+L EDFA and 54 Tb/s Transmission Over 9150 km Using Hybrid-Raman EDFA", Journal of Lightwave Technology, Vol. 33, No. 13, pp. 2724-2734 (July 2015).
Non-Patent Document 5: K. Shiraishi, et al, "Beam expanding fiber using thermal diffusion of the dopant", Journal of Lightwave Technology, Vol. 8, No. 8, pp. 1151-1161 (August 1990).
Non-Patent Document 6: J. Krause, et al, "Splice loss of single-mode fiber as related to fusion time, temperature, and index profile alteration", Journal of Lightwave Technology, Vol. 4, No. 7, pp. 837-840 (July 1986).

SUMMARY OF INVENTION

Technical Problem

As a result of examining the above-described conventional techniques, the inventors have found the following problems. That is, in order to reduce the transmission loss, a pure silica core optical fiber is generally adopted as an optical fiber used in an ultra long-haul large-capacity transmission system. In order to make such a pure silica core optical fiber, fluorine is doped to cladding as a dopant for lowering the refractive index of $SiO_2$. As described in Non-Patent Document 6, the diffusion coefficient of fluorine is about 30 times larger than the diffusion coefficient of germanium doped to the core of a normal single-mode optical fiber. As described above, when heat is applied to the vicinity of a connection point between fibers in order to form, by TEC connection, a tapered MFD in the single-mode optical fiber having a smaller MFD, the MFD mismatch rather increases because the diffusion of fluorine in the large $A_{eff}$ optical fiber is larger.

Patent Documents 2 to 5 disclose inventions relating to TEC connection between two optical fibers having mutually different MFDs. However, the invention disclosed in each of the documents cannot solve the above-described problem.

The present invention has been made to solve the above problems, and an object of the present invention is to provide an optical fiber line which is configured by connecting a single-mode optical fiber with a cladding containing fluorine and a large $A_{eff}$ optical fiber by TEC connection and in which a connection loss between the optical fibers is reduced. Another object of the present invention is to provide a method for manufacturing such an optical fiber line.

Solution to Problem

An optical fiber line according to the present invention comprises a first optical fiber, a second optical fiber, and a structure in which an end of the first optical fiber and an end of the second optical fusion-spliced together. Note that the first optical fiber is mainly comprised of silica glass and has a first core and first cladding surrounding the first core. Further, the second optical fiber is mainly comprised of silica glass and has a second core and second cladding surrounding the second core. The optical fiber line includes a first stationary section defined in the first optical fiber, a second stationary section defined in the second optical fiber, a transition section located between the first stationary section and the second stationary section. The transition section is a section in which a mode field diameter (MFD) transitions along a longitudinal direction of the optical fiber line. In the first stationary section, the first optical fiber has an effective area ($A_{eff}$) of 90 µm² or less (preferably 30 to 90 µm², more preferably 70 to 90 µm², for example) at a wavelength of 1550 nm and an MFD having a fluctuation range of less than 1.0 µm along the longitudinal direction. An inner region of the first cladding adjacent to the first core contains fluorine of 4000 to 15000 ppm (preferably 6000 to 15000 ppm, for example). On the other hand, in the second stationary section, the second optical fiber has an $A_{eff}$ of 100 to 200 µm² (preferably 120 to 170 µm², for example) at the wavelength of 1550 nm and an MFD having a fluctuation range of less than 1.0 µm along the longitudinal direction.

Furthermore, in the transition section, a connection loss expressed in decibels (dB) of a fundamental mode is equal to or less than 55% of an ideal butt loss expressed in dB at the wavelength of 1550 nm.

Note that, herein, the transition section corresponds to a certain range that extends along the longitudinal direction of the optical fiber line and includes the respective ends (a connection point) of the first optical fiber and the second optical fiber with the first optical fiber and the second optical fiber fusion-spliced. Further, the fluctuation range of the MFD is defined as a difference between maximum and minimum values of the MFD. The connection loss of the fundamental mode in the transition section corresponds to a coupling loss when the first optical fiber and the second optical fiber are optically coupled to each other with the transition section interposed therebetween, from the fundamental mode of the first optical fiber adjacent to a first end of the transition section (an end adjacent to the first optical fiber) to the fundamental mode of the second optical fiber adjacent to a second end of the transition section (an end adjacent to the second optical fiber). For the sake of brevity, the connection loss of the fundamental mode in the transition section is simply referred to as a connection loss.

Advantageous Effects of Invention

According to the present invention, it is possible to provide the optical fiber line including the single-mode optical fiber and the large $A_{eff}$ optical fiber that have cladding containing fluorine and are connected to each other by TEC connection, with a reduced connection loss between the optical fibers.

BRIEF DESCRIPTION OF DRAWINGS

FIG. 6 is a table in which specifications of a fiber 1 used as the first optical fiber in samples of the present embodiment and a comparative fiber used in comparative examples are listed.

FIG. 7 is a table in which specifications of fibers 2 to 4 used as the second optical fiber in each of the samples of the present embodiment and the comparative examples are listed.

FIG. 8 is a table in which combinations of optical fibers in samples 1 to 3 of the present embodiment and comparative examples 1 to 3 are listed.

FIG. 18 is a table in which connection loss results for the samples 1 to 3 of the present embodiment and the comparative examples 1 to 3 are listed.

DESCRIPTION OF EMBODIMENTS

Description of Embodiment of Present Invention

Figure 1:
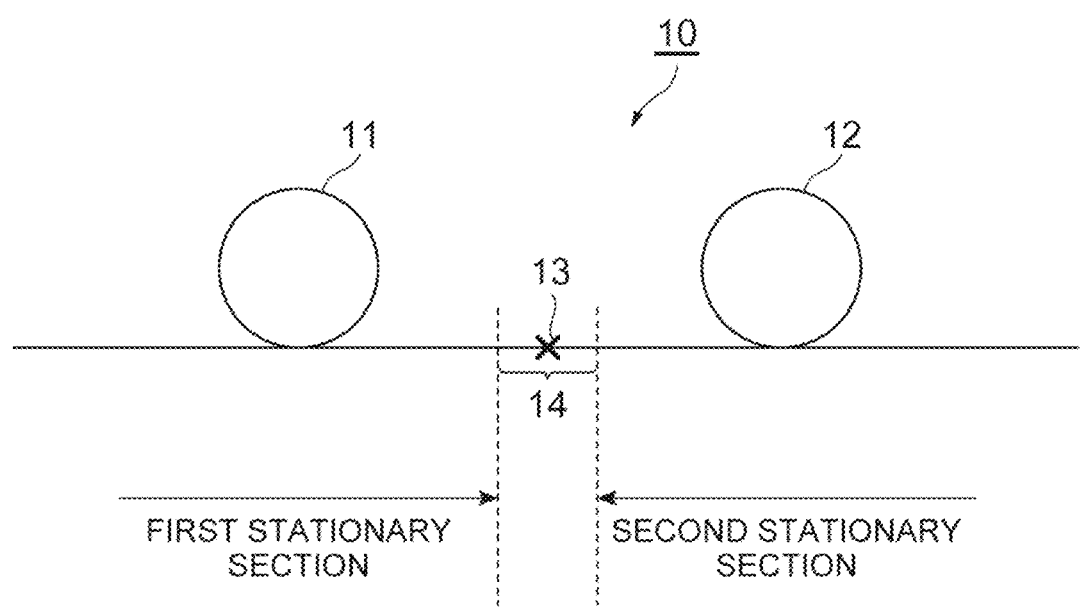
FIG. 1 is a diagram showing a configuration example of an optical fiber line 10 according to the present embodiment.

First, details of the embodiment of the present invention are individually listed and described.

(1) As an aspect of the present embodiment, an optical fiber line comprises a first optical fiber and a second optical fiber, with an end of the first optical fiber and an end of the second optical fusion-spliced together. Note that the first optical fiber is mainly comprised of silica glass and has a first core and first cladding surrounding the first core. Further, the second optical fiber is mainly comprised of silica glass and has a second core and second cladding surrounding the second core. The optical fiber line includes a first stationary section defined in the first optical fiber, a second stationary section defined in the second optical fiber, a transition section located between the first stationary section and the second stationary section. The transition section is a section in which a mode field diameter (MFD) transitions along a longitudinal direction of the optical fiber line. In the first stationary section, the first optical fiber has an effective area ($A_{eff}$) of 90 µm² or less (preferably 30 to 90 µm², more preferably 70 to 90 µm², for example) at a wavelength of 1550 nm and an MFD having a fluctuation range (a difference between a maximum value and a minimum value of the MFD) of less than 1.0 µm along the longitudinal direction. An inner region of the first cladding adjacent to the first core contains fluorine of 4000 to 15000 ppm (preferably 6000 to 15000 ppm, for example). On the other hand, in the second stationary section, the second optical fiber has an $A_{eff}$ of 100 to 200 µm² (preferably 120 to 170 µm², for example) at the wavelength of 1550 nm and an MFD having a fluctuation range of less than 1.0 µm along the longitudinal direction. Furthermore, in the transition section, a connection loss expressed in decibels (dB) of a fundamental mode is equal to or less than 55% of an ideal butt loss expressed in dB at the wavelength of 1550 nm. More preferably, the transition section includes a point at which the MFD becomes discontinuous, and on both sides of the transition section with the point interposed therebetween, the MFD monotonously varies. Further, as described above, the $A_{eff}$ of the first optical fiber at the wavelength of 1550 nm is equal to or less than 90 µm², preferably 30 to 90 µm², and more preferably 70 to 90 µm².

(2) As an aspect of the present embodiment, the second cladding of the second optical fiber may contain fluorine. In this case, in the second optical fiber, a relative refractive index difference of the second core with respect to the second cladding is preferably equal to or more than 0.2%. As an aspect of the present embodiment, a fluorine concentration in the inner region of the first cladding is preferably higher than a fluorine concentration in an inner region of the second cladding adjacent to the second core. As an aspect of the present embodiment, the fluorine concentration in the inner region of the first cladding is preferably higher than 1.05 times the fluorine concentration in the inner region of the second cladding. Further, as an aspect of the present embodiment, in any section that is within a portion of the transition section defined in the first optical fiber and has a length of 50 µm along the longitudinal direction, an MFD at an end of the any section adjacent to the second optical fiber is preferably equal to or less than 1.2 times an MFD at an end of the any section adjacent to the first optical fiber.

(3) As an aspect of the present embodiment, in a section of the transition section of the optical fiber line that is located adjacent to the first optical fiber and has a length of 300 µm or more along the longitudinal direction (for example, a section extending from a connection point located between the first optical fiber and the second optical fiber to a point that is adjacent to the first optical fiber and distanced from the connection point by 300 µm), it is preferable that the MFD continuously vary by 1.0 µm or more from the first optical fiber toward the second optical fiber.

(4) As an aspect of the present embodiment, the second optical fiber preferably has a refractive index profile of a ring core type. Further, as an aspect of the present embodiment, in each of the first and second optical fiber, it is preferable that a fluorine concentration in each of the first and second cores in a portion defined in the transition section continuously increase in a radial direction from a center of the core. As an aspect of the present embodiment, a length of the transition section along the longitudinal direction is preferably equal to or less than 1 cm. As an aspect of the present embodiment, it is preferable that the first optical fiber have a polyimide resin layer covering the first cladding. As an aspect of the present embodiment, it is preferable that the optical fiber line have a strength of 200 kpsi or more over its entire length.

(5) As an aspect of the present embodiment, an optical fiber line manufacturing method includes, in order to manufacture an optical fiber line having a structure as described above, an arranging step, a fusion-splicing step, and an additional heating step. In the arranging step, the first optical fiber and the second optical fiber are arranged in a fusion-splicing machine with the end of the first optical fiber and the end of the second optical fiber facing each other. Note that the first optical fiber is mainly comprised of silica glass and has the first core and the first cladding surrounding the first core. Further, the first optical fiber has an $A_{eff}$ of 90 µm² or less (preferably 30 to 90 µm², more preferably 70 to 90 µm², for example) at the wavelength of 1550 nm and an MFD having a fluctuation range of less than 1.0 µm along the longitudinal direction of the first optical fiber. Furthermore, the inner region of the first cladding adjacent to the first core contains fluorine of 4000 to 15000 ppm (preferably 6000 to 15000 ppm, for example). On the other hand, the second optical fiber is mainly comprised of silica glass and has the second core and the second cladding surrounding the second core. Further, the second optical fiber has an $A_{eff}$ of 100 to 200 µm² (preferably 120 to 170 µm², for example) at the wavelength of 1550 nm and an MFD having a fluctuation range of less than 1.0 µm along the longitudinal direction of the second optical fiber. In the fusion-splicing step, heat is applied to fuse the end of the first optical fiber and the end of the second optical fiber with the ends butted against each other, thereby joining the end of the first optical fiber and the end of the second optical fiber together. In the additional heating step, a certain range of the first optical fiber that is defined as extending along the longitudinal direction of the first optical fiber and includes the connection point between the first optical fiber and the second optical fiber is further heated. Here, the $A_{eff}$ of the first optical fiber at the wavelength of 1550 nm is preferably 30 to 90 µm², more preferably 70 to 90 µm², as described above.

(6) As an aspect of the present embodiment, in the additional heating step, it is preferable that the end of the first optical fiber be heated by electric discharge for 50 seconds or more with discharge power at which the first cladding does not fuse, but the fluorine diffuses. As an aspect of the present embodiment, in the additional heating step, it is preferable that a length of the certain range of the first optical fiber along the longitudinal direction be equal to or greater than a diameter of the first cladding. As an aspect of the present embodiment, in the additional heating step, it is preferable that relative movement between the certain range and a heat-applying part cause a to-be-heated point in the certain range to move along the longitudinal direction of the first optical fiber.

As described above, each of the aspects listed in "Description of embodiment of present invention" is applicable to all remaining aspects or all combinations of the remaining aspects.

Details of Embodiment of Present Invention

Hereinafter, a description will be given in detail of the optical fiber line and the optical fiber line manufacturing method according to the present embodiment. It should be noted that the present invention is not limited to these examples, and is intended to be defined by the claims and to include all modifications within the scope of the claims and their equivalents. Further, in a description of the drawings, the same components are denoted by the same reference numerals, and a redundant description will be omitted.

FIG. 1 is a diagram showing a configuration example of an optical fiber line 10 according to the present embodiment. The optical fiber line 10 includes a first optical fiber (single-mode optical fiber) 11 and a second optical fiber (large $A_{eff}$ optical fiber) 12, respective ends of which are fusion-spliced together. Each of the first optical fiber 11 and the second optical fiber 12 is mainly comprised of silica glass and has a core and cladding surrounding the core. Respective cladding diameters of the first optical fiber 11 and the second optical fiber 12 are both equal to 125 µm. A transition section 14 in which an MFD is caused to transit, due to TEC processing, along a longitudinal direction in a certain range in the longitudinal direction including a connection point (fusion-spliced portion) 13 of the first optical fiber 11 and the second optical fiber 12 is defined; A first stationary section is defined in the first optical fiber 11. On the other hand, a second stationary section is defined in the second optical fiber 12. The transition section 14 is located between the first stationary section and the second stationary section. Further, neither the first stationary section nor the second stationary section always needs to be defined as being in contact with the transition section 14.

In the first stationary section of the first optical fiber 11 except the transition section 14, the MFD is substantially uniform along the longitudinal direction of the first optical fiber 11. That is, the MFD in the first stationary section has a fluctuation range of less than 1.0 µm along the longitudinal direction. Further, the first optical fiber 11 has an $A_{eff}$ of 90 µm² or less at a wavelength of 1.55 µm. An inner region of the cladding (first cladding) of the first optical fiber 11 adjacent to the core (first core) contains fluorine of 4000 to 15000 ppm, preferably 6000 to 15000 ppm. As a result, the inner region of the cladding of the first optical fiber 11 has a refractive index that is lower by 0.14% to 0.53% than a refractive index of pure silica glass. In the second stationary section of the second optical fiber 12 except the transition section 14, the MFD is substantially uniform along the longitudinal direction of the second optical fiber 12. That is, the MFD in the second stationary section has a fluctuation range of less than 1.0 µm along the longitudinal direction. Further, the second optical fiber 12 has an $A_{eff}$ of 100 to 200 µm² at the wavelength of 1.55 µm. Here, the $A_{eff}$ of the first optical fiber 11 at the wavelength of 1.55 µm is preferably 30 to 90 µm², more preferably 70 to 90 µm². Further, the $A_{eff}$ of the second optical fiber 12 at the wavelength of 1.55 µm is preferably 170 µm² or less, more preferably 160 µm² or less, in order to suppress an increase in transmission loss in a cable state. Furthermore, the $A_{eff}$ of the second optical fiber 12 at the wavelength of 1.55 µm is preferably 120 µm² or more, more preferably 140 µm² or more, in order to suppress nonlinear noise during transmission.

In the transition section 14, a connection loss expressed in dB of a fundamental mode is equal to or less than 55% of an ideal butt loss expressed in dB at the wavelength of 1550 nm. The ideal butt loss α [dB] is a loss only caused by an MFD mismatch between the first stationary section of the first optical fiber 11 and the second stationary section of the second optical fiber 12 and is represented by the following expression (1) (see Non-Patent Document 0.3 described above). Note that, in the expression (1), $W_{12}$ denotes a value obtained by dividing the MFD in the second stationary section of the second optical fiber 12 by the MFD in the first stationary section of the first optical fiber 11.

$$\alpha = -10 \text{Log}_{10}\left\{\left(\frac{2W_{12}}{W_{12}^2 + 1}\right)^2\right\} \tag{1}$$

Figure 2:
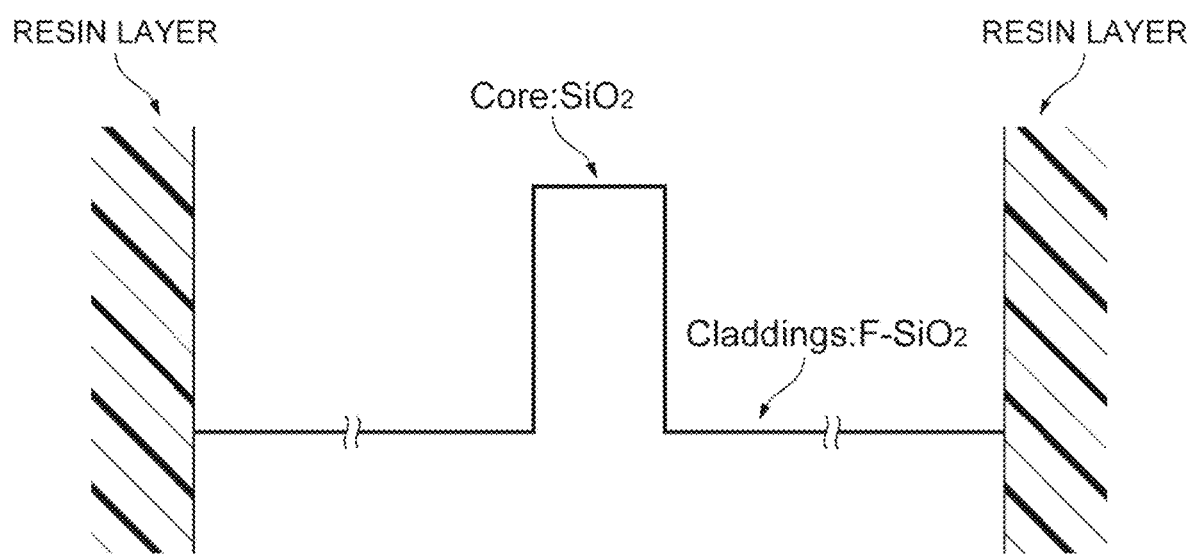
FIG. 2 is a diagram showing an example of a refractive index profile of a first optical fiber 11.

FIG. 2 is a diagram showing an example of a refractive index profile of the first optical fiber 11. The first optical fiber 11 has the core (first core) comprised of pure silica glass substantially free from impurities such as $GeO_2$ that increases the refractive index and the cladding (first cladding) comprised of silica glass containing fluorine, an impurity that increases the refractive index. Note that the refractive index profile of the first optical fiber 11 is not limited to a shape shown in FIG. 2. The refractive index profile of the first optical fiber 11 may be, for example, a shape in which the cladding of the first optical fiber 11 has the inner region that surrounds the core and an outer region that surrounds the inner region and is higher in refractive index than the inner region.

Figure 3:
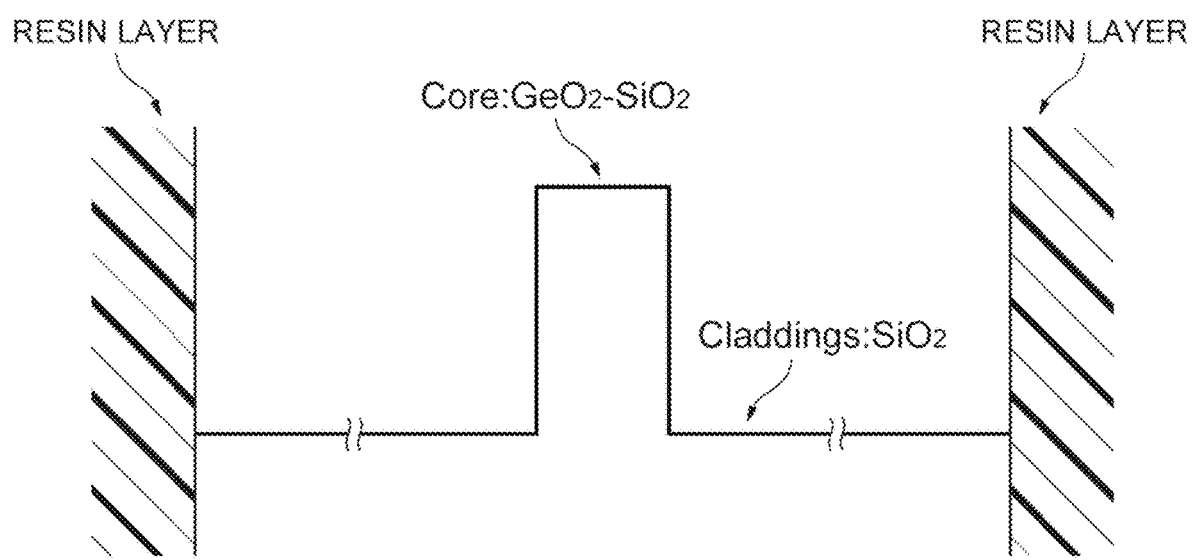
FIG. 3 is a diagram showing an example of a refractive index profile of a single-mode optical fiber serving as a comparative example.

FIG. 3 is a diagram showing an example of a refractive index profile of a single-mode optical fiber serving as a comparative example. The single-mode optical fiber serving as the comparative example includes a core comprised of silica glass containing $GeO_2$, an impurity that increases the refractive index, and the cladding comprised of pure silica glass substantially free from impurities used for refractive index adjustment.

In the single-mode optical fiber serving as the comparative example, they diffusion of germanium contained in the core brings the MFD into a tapered structure to reduce the connection loss. In contrast, in the first optical fiber 11 according to the present embodiment, thermal diffusion of the fluorine contained in the cladding of the first optical fiber 11 toward the core makes the MFD tapered. As described in Non-Patent Document 6, since fluorine is about 30 times larger in diffusion coefficient than germanium, in the first optical fiber 11 according to the present embodiment, the MFD can be easily tapered due to thermal diffusion as compared with the single-mode optical fiber serving as the comparative example. Here, in the first optical fiber 11, the inner region of the cladding adjacent to the core preferably contains fluorine of 4000 to 15000 ppm. Furthermore, the higher the concentration of fluorine is, the faster fluorine contained in the cladding diffuses toward the core, allowing a processing time to be reduced. Therefore, it is desirable that fluorine of 6000 ppm or more be doped.

Figure 4:
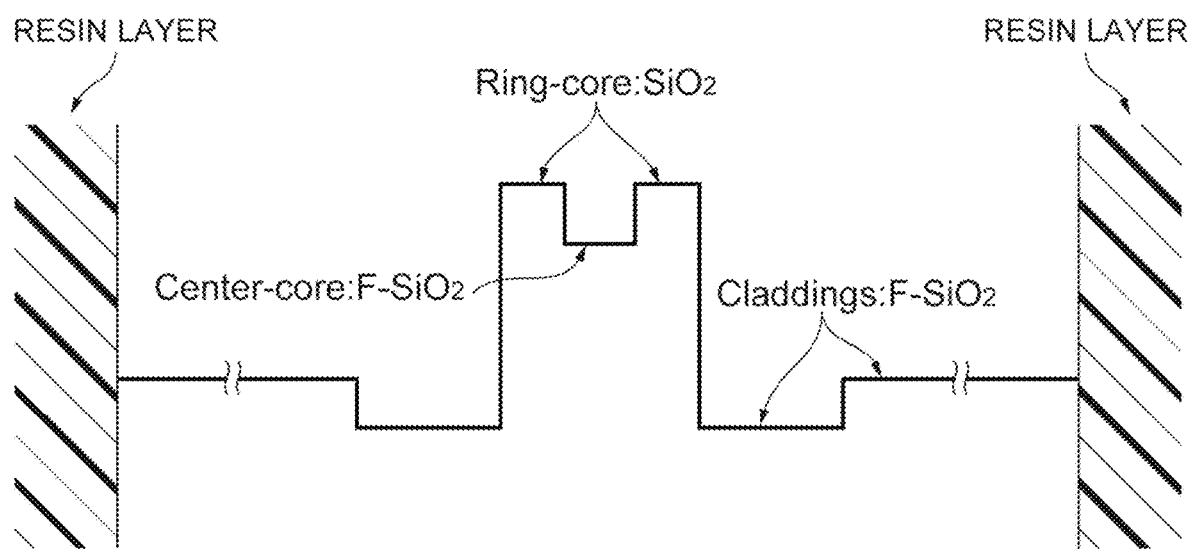
FIG. 4 is a diagram showing an example of a refractive index profile of a second optical fiber 12.

FIG. 4 is a diagram showing an example of the refractive index profile in the stationary section (second stationary section) of the second optical fiber 12. The second optical fiber 12 has a refractive index profile of a ring core type, and has a core (second core) composed of a center core and a ring core and cladding (second cladding) composed of an inner region and an outer region. The center core is comprised of silica glass containing fluorine. The ring core surrounding the center core is comprised of pure silica glass substantially free from impurities used for refractive index adjustment and is higher in refractive index than the center core. The inner region of the cladding surrounding the ring core is comprised of silica glass containing fluorine and is lower in refractive index than the ring core. Note that, of the cladding of the second optical fiber 12, the outer region surrounding the inner region is comprised of silica glass containing fluorine and is higher in refractive index than the inner region.

An optical fiber having a core with a refractive index profile of a ring core type shown in FIG. 4 allows the MFD to be small as compared with an optical fiber having a core with a refractive index profile of a step type rather than the ring core type with both the optical fibers having the same $A_{eff}$. For example, in a case where the refractive index profile of a step type is applied, the $A_{eff}$ at the wavelength of 1.55 µm is 150.7 µm², and the MFD at the wavelength of 1.55 µm is 13.8 µm. In contrast, in a case where the refractive index profile of a ring core type is applied, the $A_{eff}$ at the wavelength of 1.55 µm is 147.8 µm², and the MFD at the wavelength of 1.55 µm is 12.9 µm. Therefore, in the case where the refractive index profile of a ring core type is applied, the MFD is reduced by about 1 µm as compared with the case where the refractive index profile of a step type is applied. That is, the use of the second optical fiber 12 having the refractive index profile of a ring core type makes it possible to reduce a difference in the MFD between the first optical fiber 11 and the second optical fiber 12. In other words, even when the amount of thermal diffusion of fluorine doped to the cladding of the first optical fiber 11 is small, the connection loss between the first optical fiber 11 and the second optical fiber 12 can be sufficiently reduced.

Preferably, the cladding of the second optical fiber 12 contains fluorine, and the relative refractive index difference of the core of the second optical fiber 12 with respect to the cladding of the second optical fiber 12 is equal to or greater than 0.2%. In this case, the $GeO_2$ concentration in the core of the second optical fiber 12 can be reduced or substantially reduced to zero. That is, the transmission loss and the nonlinear refractive index of the second optical fiber 12 can be reduced.

Preferably, a fluorine concentration C1 in the inner region of the cladding of the first optical fiber 11 adjacent to the core is greater than a fluorine concentration C2 in the inner region of the cladding of the second optical fiber 12 adjacent to the core. In this case, viscosity of the cladding of the first optical fiber 11 can be made lower than viscosity of the cladding of the second optical fiber 12. That is, the fluorine in the cladding of the first optical fiber 11 can be diffused faster than the fluorine in the cladding of the second optical fiber 12. In addition, a magnification of the MFD of the first optical fiber 11 can be made greater than a magnification of the MFD of the second optical fiber 12. More preferably, the fluorine concentration C1 is higher than 1.05 times the fluorine concentration C2.

Preferably, in any section of the transition section 14 having a length of 50 µm along the longitudinal direction of the optical fiber line 10, the MFD at an end of the any section adjacent to the second optical fiber 12 is equal to or less than 1.2 times the MFD at an end of the any section adjacent to the first optical fiber 11. In a section of the transition section 14 that is located adjacent to the first optical fiber 11 and has a length of 300 µm or more (for example, a section extending from the connection point 13 to a point distanced from the connection point 13 by 300 µm), the MFD continuously varies by 1.0 µm or more. In the transition section 14, the fluorine concentration in the core of each of the first optical fiber 11 and the second optical fiber 12 continuously increases in a radial direction from a center of the core. A length of the transition section 14 along the longitudinal direction is equal to or less than 1 cm.

Preferably, the first optical fiber 11 has a polyimide resin layer covering the cladding. In a submarine repeater, a feedthrough is soldered to maintain airtightness in the repeater, so that the feedthrough is preferably covered with a heat-resistant polyimide resin. Note that the second optical fiber 12 also has a resin layer covering the cladding.

Further, the optical fiber line 10 preferably has a strength of 200 kpsi or more over its entire length. For use in an optical submarine cable system, the optical fiber line 10 is preferable because of its high reliability and high strength.

Figure 5:
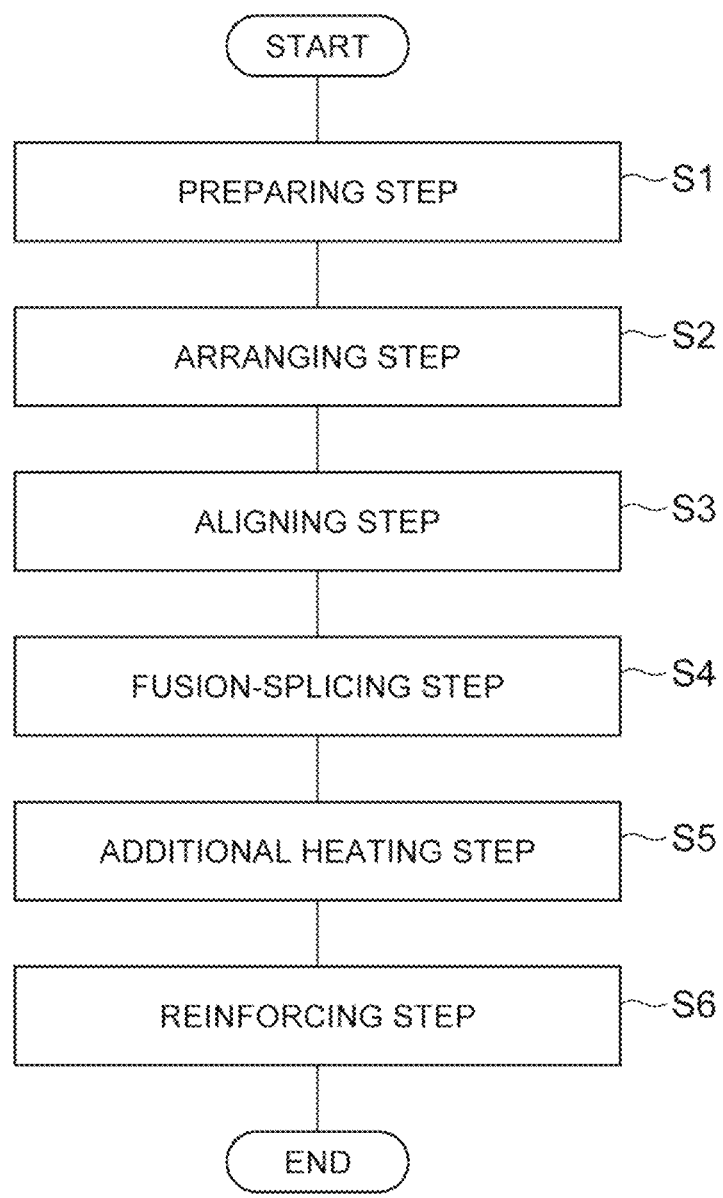
FIG. 5 is a flowchart for describing an optical fiber line manufacturing method according to the present embodiment.

FIG. 5 is a flowchart for describing the optical fiber line manufacturing method according to the present embodiment. The optical fiber line manufacturing method according to the present embodiment is a method for manufacturing the above-described optical fiber line 10 of the present embodiment, and includes a preparing step S1, an arranging step S2, an aligning step S3, a fusion-splicing step S4, an additional heating step S5, and a reinforcing step S6.

In the preparing step S1, a covering resin layer is removed in a certain range of each of the first optical fiber and the second optical fiber including their respective ends, and the respective ends of the first optical fiber and the second optical fiber are cut off by a fiber cleaver. A cut angle of an end face is preferably equal to or less than 1.0°, more preferably equal to or less than 0.5°.

In the arranging step S2, the first optical fiber and the second optical fiber are arranged in a fusion-splicing machine of an arc discharge type with the respective cut end faces of the first optical fiber and the second optical fiber facing each other.

In the aligning step S3, the first optical fiber and the second optical fiber are aligned with each other by an alignment function of the fusion-splicing machine of an arc discharge type. In this step, it is preferable that core alignment based on core position estimation using image processing or power meter alignment aided by a power meter be performed.

In the fusion-splicing step S4, an arc discharge from the fusion-splicing machine of an arc discharge type fuses the respective ends of the first optical fiber and the second optical fiber with the ends butted against each other, thereby joining the end of the first optical fiber and the end of the second optical fiber together.

In the additional heating step S5, the arc discharge from fusion-splicing machine of an arc discharge type further heats a certain range of the first optical fiber in the longitudinal direction including the connection point. In this step, a light source is optically connected to one end of a line composed of the first optical fiber and the second optical fiber already joined together, and a power meter is optically connected to the other end, and a change in the connection loss is confirmed on the basis of on an optical power measurement value obtained by the power meter. Then, the additional heating for 10 seconds is intermittently performed. As a condition for terminating the additional heating, when a variation in the connection loss between additional heating for the previous 10 seconds and additional heating for the current 10 seconds becomes equal to or less than 0.01 dB (preferably equal to or less than 0.005 dB), a determination is made that the connection loss has been minimized, and the additional heating step S5 is terminated.

In the additional heating step S5, it is preferable that the end (corresponding to a region to be the transition section) of the first optical fiber be heated for 50 seconds or more. The certain range in the longitudinal direction having a length equal to or greater than the cladding diameter is heated. Relative movement between the certain range to be heated and a heat-applying part causes a to-be-heated point in the certain range to move along the longitudinal direction. Further, the end (the certain range) of the first optical fiber is heated by electric discharge with discharge power at which the cladding of the first optical fiber portion does not fuse, but the fluorine diffuses. For example, in Patent Document 6, the discharge power is set such that a maximum heating temperature is from 1300 C° to 1800 C° both inclusive.

In the reinforcing step S6, glass is covered with a reinforcing sleeve or by recoating. This step makes it possible to obtain a strength to withstand a tensile force of 200 kpsi or more over the entire fiber length (a total length of the line composed of the first optical fiber and the second optical fiber). A recoating material is preferably an urethane acrylate resin or a polyimide resin.

Next, samples of the present embodiment and comparative examples will be described.

FIG. 6 is a table in which specifications of a fiber 1 used as the first optical fiber in the samples of the present embodiment and a comparative fiber used in the comparative examples are listed. In this table, an $A_{eff}$ at the wavelength of 1550 nm, an MFD at the wavelength of 1550 nm, a $GeO_2$ concentration in the core, an F concentration in the first cladding, and a core shape are shown. The fiber 1 has the refractive index profile shown in FIG. 2, and cladding of the fiber 1 contains a dopant. The comparative fiber has the refractive index profile shown in FIG. 3, and a core of the comparative fiber contains a dopant.

FIG. 7 is a table in which specifications of fibers 2 to 4 used as the second optical fiber in each of the samples of the present embodiment and the comparative examples are listed. In this table, an $A_{eff}$ at the wavelength of 1550 nm, an MFD at the wavelength of 1550 nm, and a core shape are shown. The fibers 2 to 4 have the refractive index profile of a ring core type shown in FIG. 4 and contains dopants.

FIG. 8 is a table in which combinations of optical fibers in samples 1 to 3 of the present embodiment and comparative examples 1 to 3 are listed. The sample 1 is composed of the fiber 1 and the fiber 2. The sample 2 is composed of the fiber 1 and the fiber 3. The sample 3 is composed of the fiber 1 and the fiber 4. The comparative example 1 is composed of the comparative fiber and the fiber 2. The comparative example 2 is composed of the comparative fiber and the fiber 3. The comparative example 3 is composed of the comparative fiber and the fiber 4.

Figure 9:
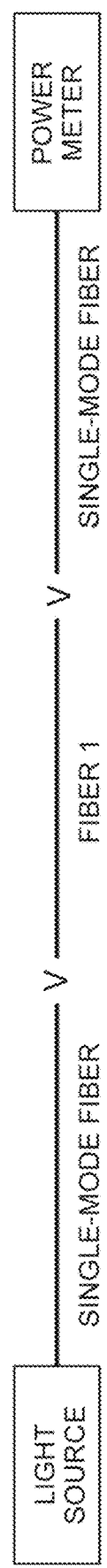
FIG. 9 is a diagram showing an example of an experimental system for reference measurement with a sample of the present embodiment.

FIG. 9 is a diagram showing an example of an experimental system for reference measurement with a sample of the present embodiment. The experimental system shown in FIG. 9 has a configuration in which a light source, a single-mode optical fiber, the fiber 1, a single-mode optical fiber, and a power meter are optically connected in that order.

Figure 10:
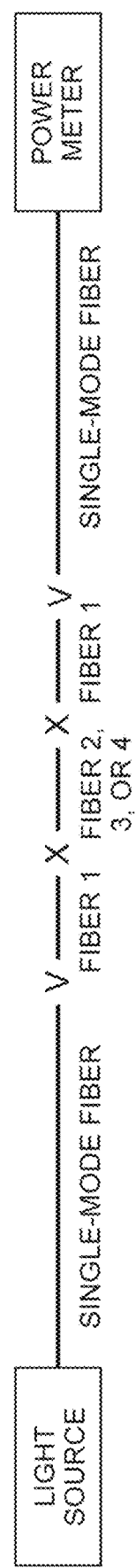
FIG. 10 is a diagram showing an example of an experimental system for connection loss measurement with a sample of the present embodiment.

FIG. 10 is a diagram showing an example of an experimental system for connection loss measurement with a sample of the present embodiment. The experimental system shown in FIG. 10 has a configuration in which a light source, a single-mode optical fiber, the fiber 1, any one of the fibers 2 to 4, the fiber 1, a single-mode optical fiber, and a power meter are optically connected in that order.

Figure 11:
FIG. 11 is a diagram showing an example of an experimental system for reference measurement with a comparative example.

FIG. 11 is a diagram showing an example of an experimental system for reference measurement with a comparative example. The experimental system shown in FIG. 11 has a configuration in which a light source, a single-mode optical fiber, the comparative fiber, a single-mode optical fiber, and a power meter are optically connected in that order.

Figure 12:
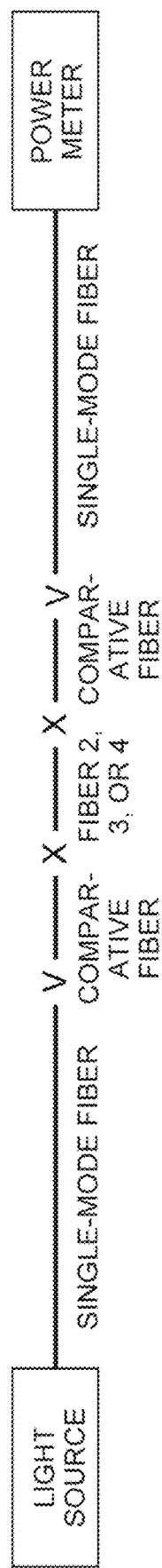
FIG. 12 is a diagram showing an example of an experimental system for connection loss measurement with a comparative example.

FIG. 12 is a diagram showing an example of an experimental system for connection loss measurement with a comparative example. The experimental system shown in FIG. 12 has a configuration in which a light source, a single-mode optical fiber, the comparative fiber, any one of the fibers 2 to 4, the comparative fiber, a single-mode optical fiber, and a power meter are optically connected in that order.

Note that, in each of the experimental systems shown in FIGS. 9 to 12, the symbol "V" denotes V-groove connection (butting connection using a V groove) between fibers. That is, in each of the experimental systems shown in FIGS. 9 to 12, the single-mode optical fiber and the fiber 1 are butted against and connected to each other along the V groove. The single-mode optical fiber and the comparative fiber are butted against and connected to each other along the V groove. Further, in each of the experimental systems shown in FIGS. 9 to 12, the symbol "X" denotes fusion-splicing connection between fibers. That is, in each of the experimental systems shown in FIGS. 9 to 12, the fiber 1 and one of the fibers 2 to 4 are fusion-spliced. The comparison fiber and one of the fibers 2 to 4 are fusion-spliced. Furthermore, in the additional heating step after the fusion-splicing, the fiber 1 and the comparative fiber were each heated by the arc discharge in a range of 200 μm or more in the longitudinal direction including the connection point.

The connection loss of each of the samples of the present embodiment and the comparative examples was obtained by dividing a difference between a power meter measurement value at the reference measurement and a power meter measurement value at the connection loss measurement by two.

Figure 13:
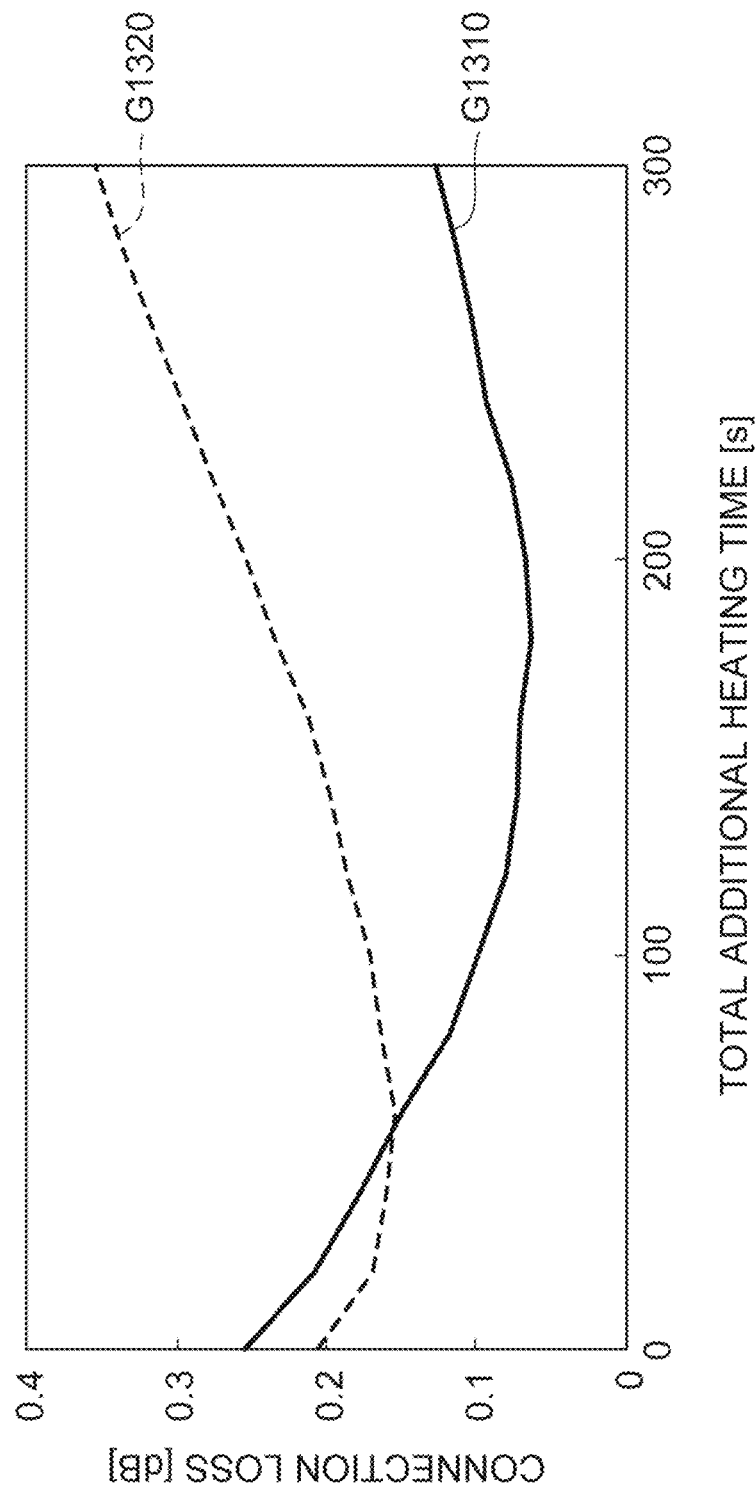
FIG. 13 is a graph showing a relation between a total additional heating time and a connection loss for each of the sample 2 of the present embodiment and the comparative example 2.

FIG. 13 is a graph showing a relation between a total additional heating time and a connection loss of the sample 2 of the present embodiment and the comparative example 2. Note that, in FIG. 13, a graph G1310 shows a relation between the total additional heating time and the connection loss of the sample 2, and a graph G1320 shows a relation between the total additional heating time and the connection loss of the comparative example 2. As the total additional heating time increases, the connection loss monotonically decreases at first, becomes minimum at some point, and then monotonically increases. The connection loss of the sample 2 becomes minimum at a total additional heating time that is equal to or greater than three times a total additional heating time of the comparative example 2. A local minimum value of the connection loss of the sample 2 is lower than a local minimum value of the connection loss of the comparative example 2. This is because an amount of MFD mismatch eliminated by a tapered MFD formed in the first optical fiber is greater in the sample 2 than in the comparative example 2.

Figure 14:
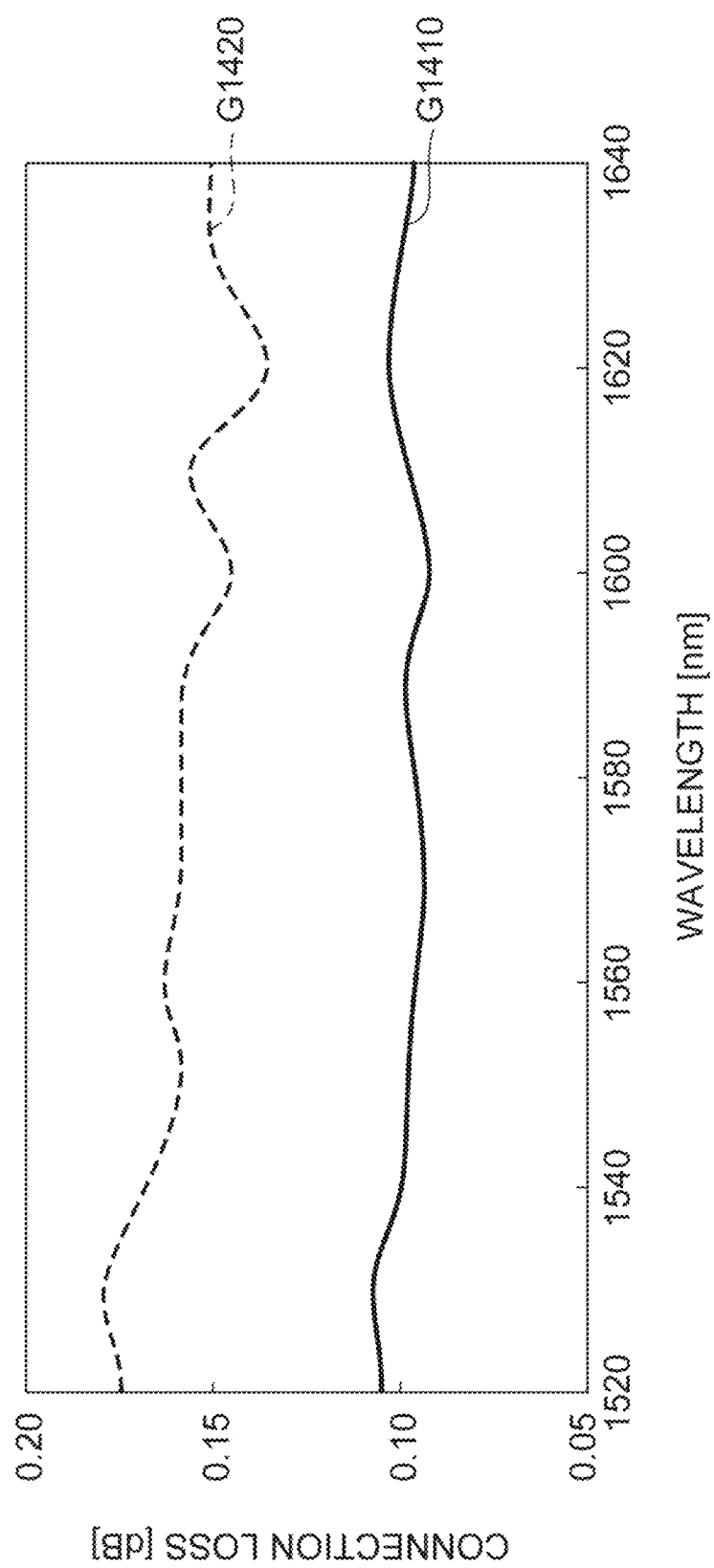
FIG. 14 is a graph showing connection loss wavelength dependency at the total additional heating time when the connection loss becomes minimum for each of the sample 2 of the present embodiment and the comparative example 2.

FIG. 14 is a graph showing connection loss wavelength dependency when the connection loss at 1550 nm becomes minimum for each of the sample 2 of the present embodiment and the comparative example 2. In FIG. 14, a graph G1410 shows connection loss wavelength dependency of the sample 2, and a graph G1420 shows connection loss wavelength dependency of the comparative example 2. In the comparative example 2, the connection loss tends to increase as the wavelength becomes shorter, but the sample 2 has small wavelength dependency in C and L bands as compared with the comparative example 2.

Figure 15:
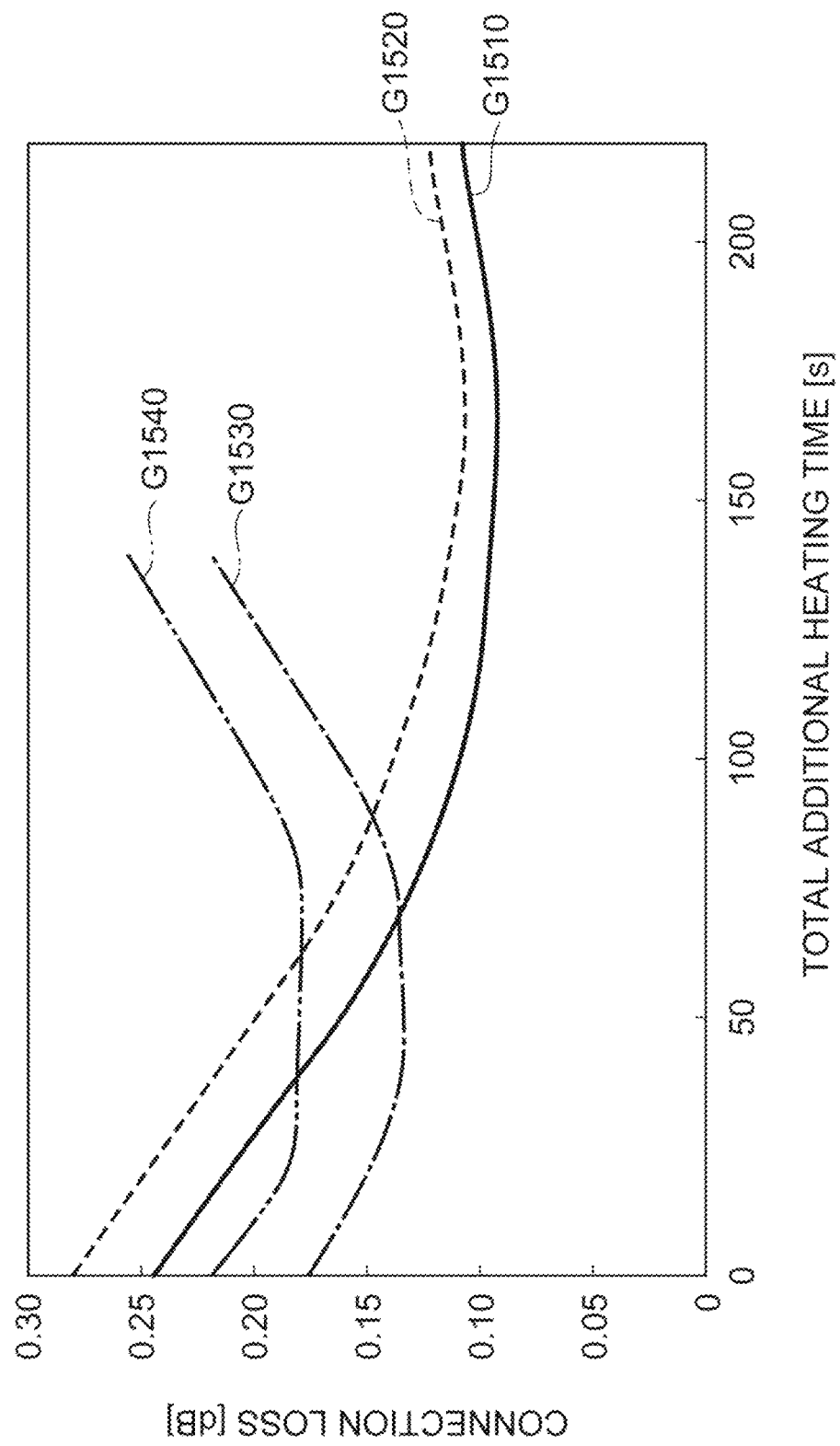
FIG. 15 is a graph showing changes in maximum value and minimum value of the connection loss with respect to the total additional heating time in a wavelength region from 1520 nm to 1640 nm for each of the sample 2 of the present embodiment and the comparative example 2.

FIG. 15 is a graph showing changes in maximum value and minimum value of the connection loss in a wavelength region from 1520 nm to 1640 nm for the sample 2 of the present embodiment and the comparative example 2. Note that, in FIG. 15, a graph G1510 shows a change in minimum value (1520 nm to 1640 nm) of the connection loss of the sample 2, a graph G1520 shows a change in maximum value (1520 nm to 1640 nm) of the connection loss of the sample 2, a graph G1530 shows a change in minimum value (1520 nm to 1640 nm) of the connection loss of the comparative example 2, and a graph G1540 shows a change in maximum value (1520 nm to 1640 nm) of the connection loss of the comparative example 2.

As can be seen from FIG. 15, when the total additional heating time is 0 second, a value obtained by subtracting the minimum value of the connection loss from the maximum value of the connection loss of each of the sample 2 and the comparative example 2 is substantially the same. The value obtained by subtracting the minimum value of the connection loss from the maximum value of the connection loss of the sample 2 decreases relative to a total additional heating time, and reduces to a half or less than a half of the value when the total additional heating time is 0 seconds. That is, as compared with the comparative example 2, the sample 2 can reduce the connection loss uniformly in a wide band and is suitable for wavelength division multiplexing optical communication.

Figure 16:
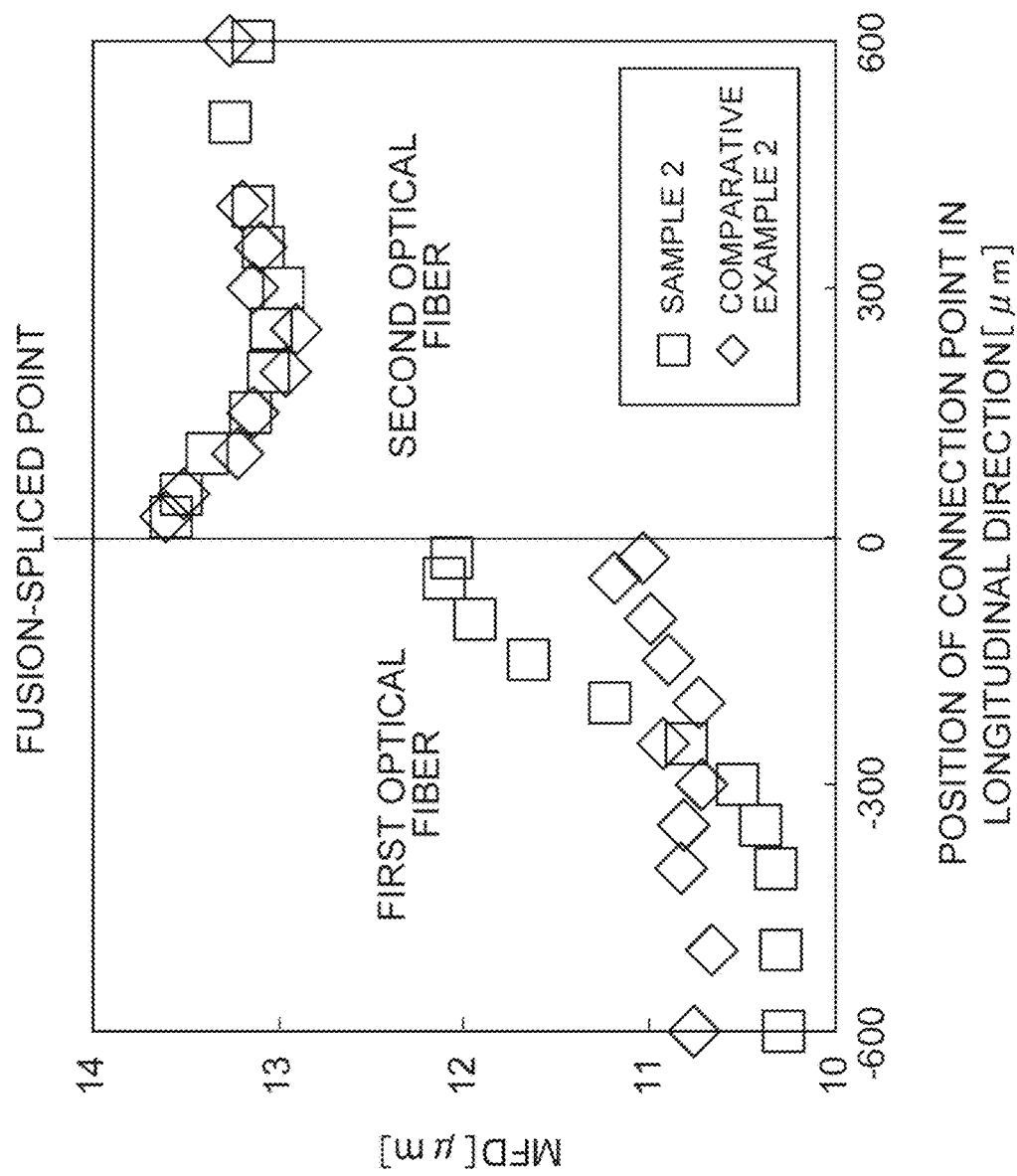
FIG. 16 is a graph showing changes in MFD at a wavelength of 1.55 µm with respect to a position in a longitudinal direction when the connection loss becomes minimum for each of the sample 2 of the present embodiment and the comparative example 2.

FIG. 16 is a graph showing a change in MFD with respect to a position in the longitudinal direction when the connection loss becomes minimum for each of the sample 2 of the present embodiment and the comparative example 2. Note that, in FIG. 16, a point where the MFD discontinuously changes is defined as a point 0, a minus side, that is a left side, of the point 0 is defined as a first optical fiber side, and a plus side, that is, a right side, of the point 0 is defined as a second optical fiber side. For the sample 2, a change in MFD at the wavelength of 1.55 μm varies by 1.5 μm or more with respect to a length of 300 μm along the longitudinal direction on a fiber 1 side (the first optical fiber side). On the other hand, for the comparative example 2, a change in MFD at the wavelength of 1.55 μm varies by 0.3 μm or more with respect to the length of 300 μm along the longitudinal direction on a comparative fiber side (the first optical fiber side). This distinct difference is due to the fact that the sample 2 uses, as the first optical fiber, the fiber 1 having the cladding doped with fluorine that is about 30 times larger in diffusion coefficient than germanium. Further, the transition of the MFD in the transition section is preferably 1 cm or less at maximum over the entire first optical fiber and the second optical fiber.

Figure 17:
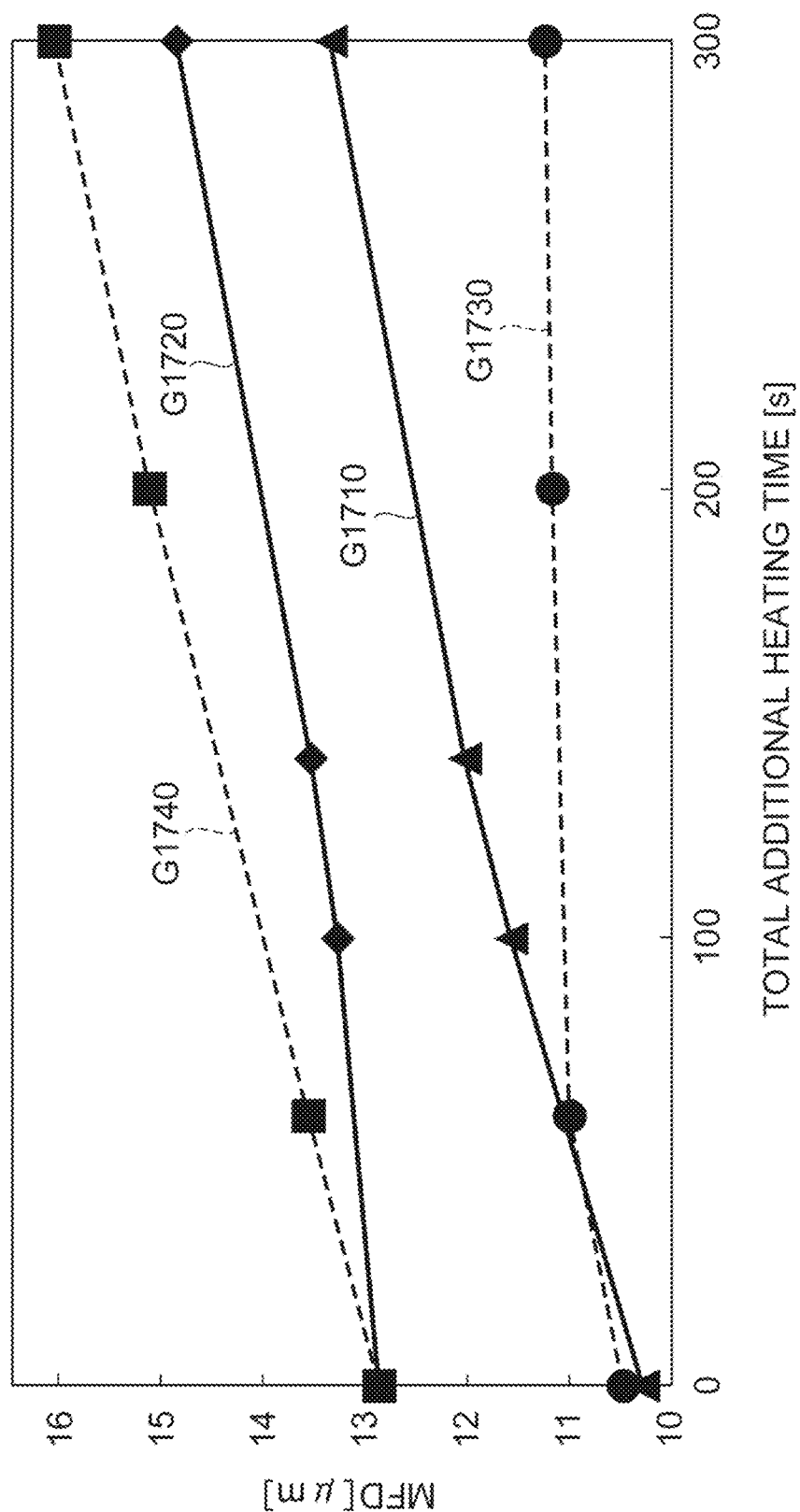
FIG. 17 is a graph showing a relation between the total additional heating time and the MFD of each optical fiber for each of the sample 2 of the present embodiment and the comparative example 2.

FIG. 17 is a graph showing a relation between the total additional heating time and the MFD of each optical fiber in the sample 2 of the present embodiment and the comparative example 2. Note that, in FIG. 17, a graph G1710 shows a relation between the total additional heating time and the MFD of the first optical fiber (fiber 1) in the sample 2, a graph G1720 shows a relation between the total additional heating time and the MFD of the second optical fiber (fiber 3) in the sample 2, a graph G1730 shows a relation between the total additional heating time and the MFD of the first optical fiber (comparative fiber) in the comparative example 2, a graph G1740 shows a relation between the total additional heating time and the MFD of the second optical fiber (fiber 3) in the comparative example 2. Here, the MFD of each optical fiber is a value measured at a point distanced from the point 0 by 25 μm. For the comparative example 2, the MFD of fiber 3 continues to increase as the total additional heating time increases. In contrast, the MFD of the comparative fiber hardly increases after the total additional heating time reaches 60 seconds. On the other hand, for the sample 2, both the MFDs of the fiber 1 and the fiber 3 continue to increase as the total additional heating time increases. As can be seen from this result, doping of fluorine to the cladding facilitates eliminating the MFD mismatch in a transition section, that is, exhibits an effect of lowering the connection loss.

Figure 19:
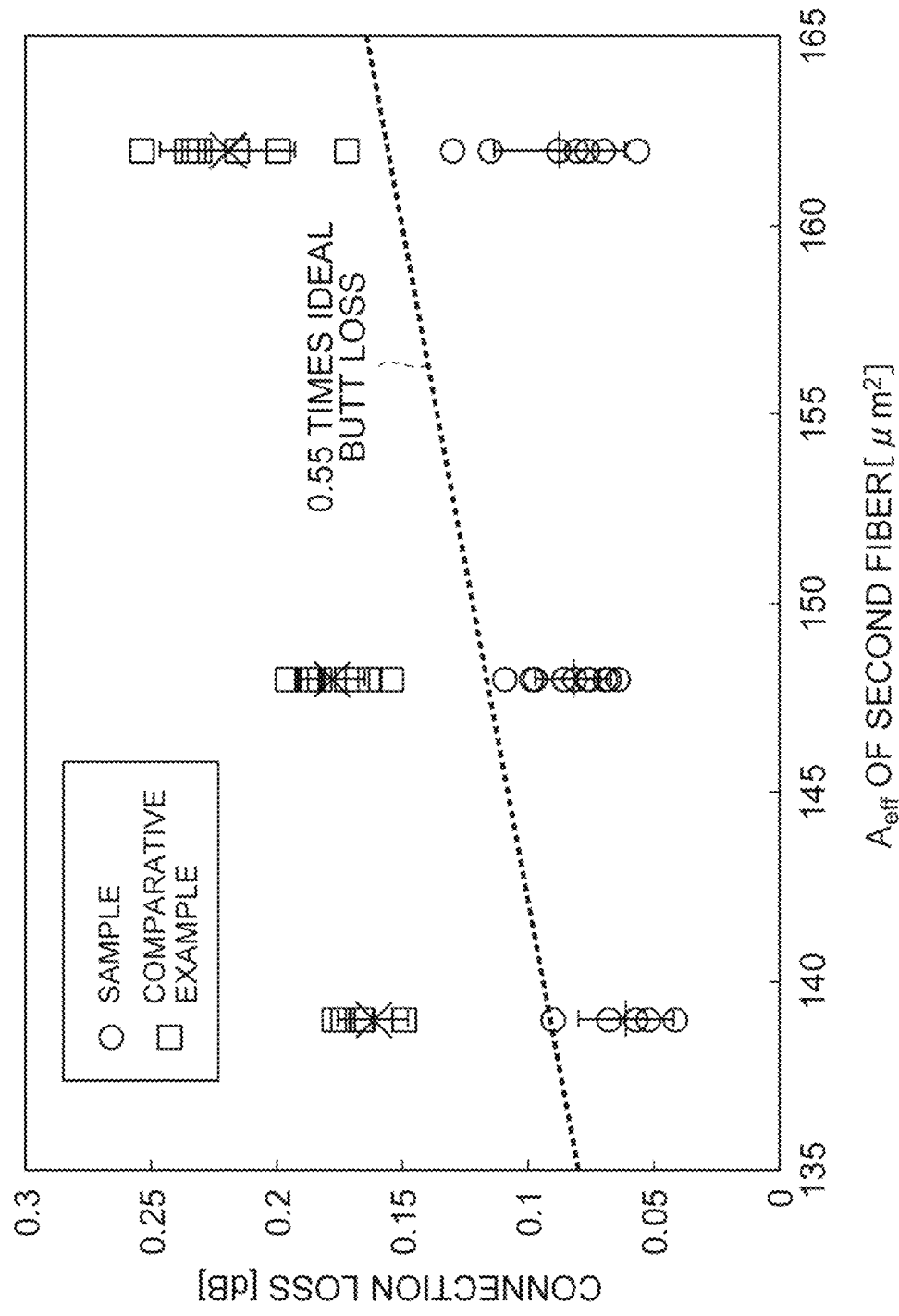
FIG. 19 is a graph showing connection loss results in a case where an additional heating step is performed for each of the samples 1 to 3 of the present embodiment and the comparative examples 1 to 3.

FIG. 18 is a table in which connection loss results of the samples 1 to 3 of the present embodiment and the comparative examples 1 to 3 are listed. Further, FIG. 19 is a graph showing connection loss results in a case where the additional heating step is performed on each of the samples 1 to 3 of the present embodiment and the comparative examples 1 to 3. Comparing a sample example of the present embodiment with a comparative example, both the examples using the second optical fibers having the same $A_{eff}$, revealed that no significant difference in connection loss is present between the examples without the additional heating step. However, with the additional heating step, the connection loss of the sample of the present embodiment could be reduced to a half or less than a half of the connection loss of the comparative example.

Furthermore, when comparing connection losses of each of the samples with and without the additional heating step, the connection loss of each of the samples using the fiber 1 as the first optical fiber was reduced to 33% (⅓) or less than 33% due to the additional heating step. On the other hand, the connection loss of each of the comparative examples using the comparative fiber as the first optical fiber was reduced to a range from 65% to 85% due to the additional heating step. As can be seen from these results, it can be said that the cladding doped with fluorine has the effect of further lowering the connection loss through the additional heating step.

Further, a dotted line shown in FIG. 19 shows 55% of the ideal butt loss expressed in dB. In practice, a connection loss lower than 55% of the ideal butt loss expressed in dB can be regarded as a significantly low connection loss, and therefore an optical fiber line with a connection loss significantly reduced by the manufacturing method according to the present invention can be realized.

Note that the above Non-Patent Document 3 includes a report in which in a case where a single-mode optical fiber having a core containing $GeO_2$ and a large $A_{eff}$ optical fiber having a step type core shape and an $A_{eff}$ of 150.7 $\mu m^2$ at the wavelength of 1.55 μm are connected to each other, the connection loss becomes 0.30 dB. The result of the comparative example 2 correspond to this report, but the connection loss of the comparative example 2 is 0.23 dB even without the additional heating step, which is 0.07 dB lower than the result described in Non-Patent Document 3. This reveals the effect of using the large $A_{eff}$ optical fiber having the refractive index profile of a ring core type as the second optical fiber in the comparative example 2.

REFERENCE SIGNS LIST

10 . . . optical fiber line; 11 . . . first optical fiber; 12 . . . second optical fiber; 13 . . . connection point; and 14 . . . transition section.

The invention claimed is:

1. An optical fiber line comprising:
 a first optical fiber; and
 a second optical fiber having an end connected to an end of the first optical fiber by fusion-splicing, wherein
 the first optical fiber is mainly comprised of silica glass and has a first core and first cladding surrounding the first core, and the second optical fiber is mainly comprised of silica glass and has a second core and second cladding surrounding the second core,
 the optical fiber line includes a first stationary section defined in the first optical fiber, a second stationary section defined in the second optical fiber, and a transition section located between the first stationary section and the second stationary section, the transition section having a mode field diameter MFD transitioning along a longitudinal direction of the optical fiber line,
 in the first stationary section, the first optical fiber has an effective area $A_{eff}$ of 90 $\mu m^2$ or less at a wavelength of 1550 nm and a mode field diameter MFD having a fluctuation range of less than 1.0 um along the longitudinal direction,
 the first cladding includes an inner region of the first cladding, the inner region of the first cladding being adjacent to the first core and containing fluorine of 4000 to 15000 ppm,
 in the second stationary section, the second optical fiber has an effective area $A_{eff}$ of 100 to 200 $\mu m^2$ at the wavelength of 1550 nm and a mode field diameter MFD having a fluctuation range of less than 1.0 μm along the longitudinal direction,
 in the transition section, a connection loss expressed in decibels of a fundamental mode is equal to or less than 55% of an ideal butt loss expressed in decibels at the wavelength of 1550 nm,
 the second cladding contains fluorine,
 in the second optical fiber, a relative refractive index difference of the second core with respect to the second cladding is equal to or greater than 0.2%, and
 the second cladding includes an inner region of the second cladding, the inner region of the second cladding being adjacent to the second core, and a fluorine concentration in the inner region of the first cladding is higher than a fluorine concentration in the inner region of the second cladding.

2. The optical fiber line according to claim 1, wherein the optical fiber line has a strength of 200 kpsi or more over an entire length of the optical fiber line.

3. The optical fiber line according to claim 1, wherein a fluorine concentration in each of the first core and the second core in the transition section continuously increases in the radial direction from a center of the core.

4. The optical fiber line according to claim 1, wherein the fluorine concentration in the inner region of the first cladding is higher than 1.05 times the fluorine concentration in the inner region of the second cladding.

5. The optical fiber line according to claim 1, wherein in any section that is within a portion of the transition section defined in the first optical fiber and has a length of 50 μm along the longitudinal direction, a mode field diameter MFD at an end of the any section adjacent to the second optical fiber is equal to or less than 1.2 times a mode field diameter MFD at an end of the any section adjacent to the first optical fiber.

6. The optical fiber line according to claim 1, wherein the second optical fiber has a refractive index profile of a ring core type.

7. The optical fiber line according to claim 1, wherein the first optical fiber has a polyimide resin layer covering the first cladding.

8. The optical fiber line according to claim 1, wherein the transition section has a length equal to or less than 1 cm along the longitudinal direction.

9. An optical fiber line manufacturing method for manufacturing an optical fiber line comprising:
 a first optical fiber; and
 a second optical fiber having an end connected to an end of the first optical fiber by fusion-splicing, wherein
 the first optical fiber is mainly comprised of silica glass and has a first core and first cladding surrounding the first core, and the second optical fiber is mainly comprised of silica glass and has a second core and second cladding surrounding the second core,
 the optical fiber line includes a first stationary section defined in the first optical fiber, a second stationary section defined in the second optical fiber, and a transition section located between the first stationary section and the second stationary section, the transition section having a mode field diameter MFD transitioning along a longitudinal direction of the optical fiber line,
 in the first stationary section, the first optical fiber has an effective area $A_{eff}$ of 90 $\mu m^2$ or less at a wavelength of 1550 nm and a mode field diameter MFD having a fluctuation range of less than 1.0 μm along the longitudinal direction, the first cladding includes an inner region of the first cladding, the inner region of the first cladding being adjacent to the first core and containing fluorine of 4000 to 15000 ppm, in the second stationary section, the second optical fiber has an effective area $A_{eff}$ of 100 to 200 µm² at the wavelength of 1550 nm and a mode field diameter MFD having a fluctuation range of less than 1.0 µm along the longitudinal direction, in the transition section, a connection loss expressed in decibels of a fundamental mode is equal to or less than 55% of an ideal butt loss expressed in decibels at the wavelength of 1550 nm, and the method comprises:

arranging a first optical fiber and a second optical fiber in a fusion-splicing machine with an end of the first optical fiber and an end of the second optical fiber facing each other, wherein the first optical fiber is mainly comprised of silica glass, has a first core and first cladding surrounding the first core, has an effective area $A_{eff}$ of 90 µm² or less at a wavelength of 1550 nm and a mode field diameter MFD having a fluctuation range of less than 1.0 µm along a longitudinal direction of the first optical fiber, an inner region of the first cladding adjacent to the first core contains fluorine of 4000 to 15000 ppm, and the second optical fiber is mainly comprised of silica glass, has a second core and second cladding surrounding the second core, has an effective area $A_{eff}$ of 100 to 200 µm² at the wavelength of 1550 nm and a mode field diameter MFD having a fluctuation range of less than 1.0 µm along a longitudinal direction of the second optical fiber;

fusion-splicing the end of the first optical fiber and the end of the second optical fiber together by applying heat to fuse the end of the first optical fiber and the end of the second optical fiber with the ends butted against each other; and additionally heating a certain range of the first optical fiber, the certain range being defined as extending along the longitudinal direction of the first optical fiber and including a connection point between the first optical fiber and the second optical fiber.

10. The optical fiber line manufacturing method according to claim 9, wherein in the additionally heating, the certain range has a length equal to or greater than a diameter of the first cladding along the longitudinal direction of the first optical fiber.

11. The optical fiber line manufacturing method according to claim 9, wherein in the additionally heating, relative movement between the certain range and a heat-applying part causes a to-be-heated point in the certain range to move along the longitudinal direction of the first optical fiber.

12. The optical fiber line manufacturing method according to claim 9, wherein the additionally heating includes heating the end of the first optical fiber by electric discharge for 50 seconds or more with discharge power at which the first cladding does not fuse, but the fluorine diffuses.

13. An optical fiber line comprising:

a first optical fiber; and a second optical fiber having an end connected to an end of the first optical fiber by fusion-splicing, wherein the first optical fiber is mainly comprised of silica glass and has a first core and first cladding surrounding the first core, and the second optical fiber is mainly comprised of silica glass and has a second core and second cladding surrounding the second core, the optical fiber line includes a first stationary section defined in the first optical fiber, a second stationary section defined in the second optical fiber, and a transition section located between the first stationary section and the second stationary section, the transition section having a mode field diameter MFD transitioning along a longitudinal direction of the optical fiber line, in the first stationary section, the first optical fiber has an effective area $A_{eff}$ of 90 µm² or less at a wavelength of 1550 nm and a mode field diameter MFD having a fluctuation range of less than 1.0 µm along the longitudinal direction, the first cladding includes an inner region of the first cladding, the inner region of the first cladding being adjacent to the first core and containing fluorine of 4000 to 15000 ppm, in the second stationary section, the second optical fiber has an effective area $A_{eff}$ of 100 to 200 µm² at the wavelength of 1550 nm and a mode field diameter MFD having a fluctuation range of less than 1.0 µm along the longitudinal direction, in the transition section, a connection loss expressed in decibels of a fundamental mode is equal to or less than 55% of an ideal butt loss expressed in decibels at the wavelength of 1550 nm, and a fluorine concentration in each of the first core and the second core in the transition section continuously increases in a radial direction from a center of the core.

14. The optical fiber line according to claim 13, wherein the first optical fiber has a polyimide resin layer covering the first cladding.

15. The optical fiber line according to claim 13, wherein the optical fiber line has a strength of 200 kpsi or more over an entire length of the optical fiber line.

16. The optical fiber line according to claim 13, wherein in any section that is within a portion of the transition section defined in the first optical fiber and has a length of 50 µm along the longitudinal direction, a mode field diameter MFD at an end of the any section adjacent to the second optical fiber is equal to or less than 1.2 times a mode field diameter MFD at an end of the any section adjacent to the first optical fiber.

17. The optical fiber line according to claim 13, wherein the second optical fiber has a refractive index profile of a ring core type.

18. The optical fiber line according to claim 13, wherein the transition section has a length equal to or less than 1 cm along the longitudinal direction.

* * * * *